Feb. 24, 1959   G. V. MORRIS   2,874,977
CODE CARD DEVICE
Filed Feb. 14, 1957
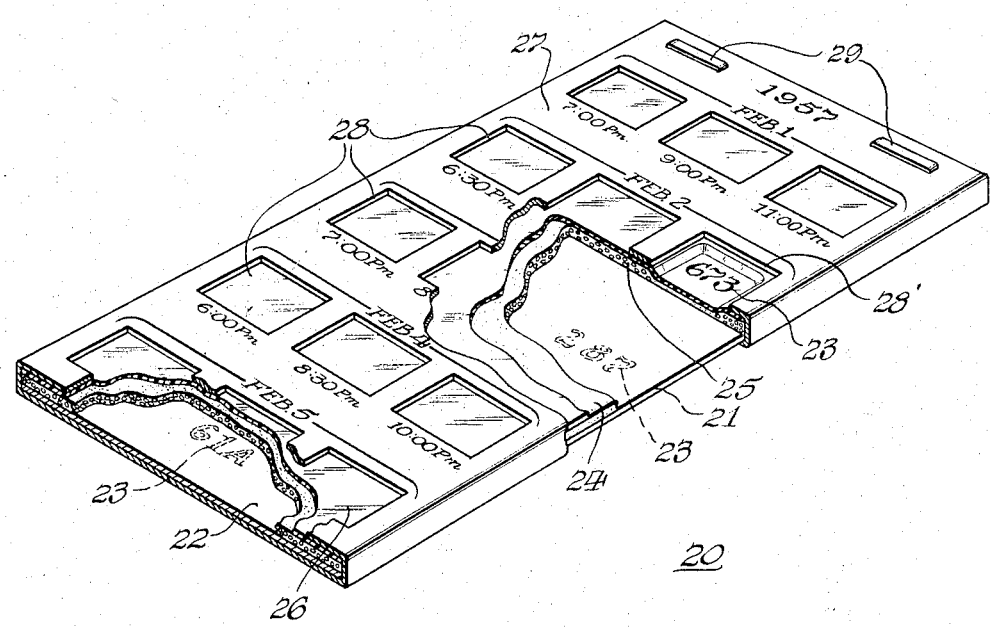
Inventor
George V. Morris
by John J. Pederson
Attorney

United States Patent Office 2,874,977
Patented Feb. 24, 1959

2,874,977

CODE CARD DEVICE

George V. Morris, Chicago, Ill., assignor to Zenith Radio Corporation, a corporation of Delaware Application February 14, 1957, Serial No. 640,241

1 Claim. (Cl. 283—6)

This invention relates to code card devices adapted for use in the distribution of decoding information such as that required for commercial operation of subscription television systems and the like.

Commercial exploitation of subscription television requires that appropriate decoding information be distributed the individual subscribers in a manner which preserves the secrecy of the code while permitting an accurate determination of the extent of each subscriber's use of the subscription television facilities. Various approaches to the problem of distributing decoding information have been evolved. Maximum security may be achieved by disseminating the decoding information over closed-wire circuits such as the existing telephone lines, but this approach necessitates the use of specialized and not inexpensive equipments and makes no provision for utilization of the subscription service by individuals who are not telephone subscribers. These objections may be avoided without substantial sacrifice in security by broadcasting the decoding information, itself in coded form, concurrently with the scrambled program information and providing each subscriber with a decoding translator which must be preset by the subscriber to utilize the broadcast decoding information; in a system of this sort, each translator is adjustable to any of a large number of operating conditions of which only one properly conditions the apparatus for intelligible reproduction of the program information. For optimum security, each translator must require a different setting for any given program, and there must be no fixed correlation between the correct settings of particular translators from one program to the next.

In a system of this latter type, it is most desirable to distribute at least a portion of the translator-setting information to each subscriber for all programs within a predetermined period, e. g., a month, in advance, in order to provide maximum flexibility in the commercial operation of the system. To achieve this objective while preserving a record of actual utilization of such information by each subscriber, so that an appropriate charge for the service can be levied, it has been proposed that code cards containing the required translator-setting information, properly individualized for each subscriber, be distributed by mail to all subscribers whose credit is in good standing. Such code cards may be constituted as punch cards of conventional construction, with concealed indicia at each of a plurality of appropriately designated locations corresponding to the coded programs scheduled for the contemplated period. A subscriber desiring to view a particular coded telecast merely punches out the card at the appropriate location and presets his translator in the manner indicated by the thus-exposed indicia; this, of course, leaves a tell-tale indication on the card which serves as the basis for issuing a bill when the card is returned by the subscriber at the end of the period in question, as a necessary condition to receiving a new punch card for the ensuing program period.

It is a primary object of this invention to provide a novel code card suitable for use in conveying decoding information in a subscription television system of the type described.

It is a further object of this invention to provide a code card not susceptible to fraudulent acquisition of the decoding information without leaving a tell-tale indication of its appropriation.

It is likewise an object of this invention to provide such a new and improved code card which may be economically manufactured and distributed.

A code card device constructed in accordance with this invention comprises an opaque base member having a surface bearing code indicia of an invisible ink. A layer comprising a rupturable solid film contains a developer for the invisible ink and is normally withheld from contact with the indicia. The film is disposed between the base member and an overlying transparent cover member. The developer is color reactant with the invisible ink upon contact. Upon application of localized pressure, the film ruptures thereby initiating such contact to impart a permanent distinctive hue to the code indicia in contrast to the base member.

The features of the present invention which are believed to be novel are set forth with particularity in the appended claims. The organization and manner of operation of the invention, together with further objects and advantages thereof, may best be understood by reference to the following description taken in connection with the accompanying drawing, in which the single figure illustrates a fragmentary perspective view of a code card device constructed in accordance with the invention.

A code card device 20 embodying the invention includes an opaque base member 21 of paper or the like, having a surface 22 bearing the code indicia 23 comprised of an invisible ink or marking material. A rupturable solid film 24 is disposed upon surface 22 and contains a uniformly dispersed developer 25 which can be in droplet form. Solid film 24 provides a binder and vehicle for developer 25 and can be composed of gelatin or other material of like rupturable properties. A transparent cover member 26 which may consist of cellophane or transparent Celluloid overlies surface 22 of base member 21 and is contiguous to film 24. Appropriate code indicia 23 of which only a few are shown, are provided on surface 22 in a predetermined spatial relationship. A multi-apertured encasing member 27 incorporates a plurality of apertures 28 which are positioned in like spatial relationship so as to be in alignment with code indicia 23. Base member 21, transparent cover member 26, and solid film 24 constitute a laminate construction which is enveloped by encasing member 27, and the laminate is secured by conventional means such as staples 29. Encasing member 27 may be formed from a thin metallic sheet, e. g., aluminum foil, to assure the secrecy of the code indicia and further to provide a protective wrapper, moreover, encasing member 27 may be calendared in the manner shown or by other suitable means to program events available on a subscription television system.

Code indicia 23 are so applied to surface 22 of base member 21 as to blend invisibly with the background of surface 22, as by printing with an invisible ink, which may be defined as any material, liquid or solid, which upon application to a surface nondiscernably blends with that surface and is thereafter susceptible to development on contact with an appropriate developer. Any known invisible ink subject to contact development may be employed; among known materials of this type are those having either absorbent or adsorbent color reactant properties, i. e., the substance may, as respects the former, become imbued with a developer reagent and thus change color, or in the latter case, the substance may undergo color change under the influence of a developer which through the phenomenon of molecular adhesion accomplishes such color change. Developer 25 then, may constitute droplets of reagents known in the art which upon intimate contact with invisible ink substances are capable of imparting a permanent hue to code indicia 23. Of course, the color of the developer indicia is dependent on the reagents employed, and many different hues, including gradations of black, may be obtained. Merely by way of illustration and in no sense by way of limitation, a water dispersion of attapulgite may be employed as the invisible ink material and crystal violet lactone dispersed in chlorinated diphenyl as the developer. When these materials are employed, development in response to localized pressure results in a display of the code indicia in dark blue.

Accordingly, upon application of localized pressure to cover member 26, the corresponding portion of film 24 subjected to such pressure ruptures thus placing droplets of developer 24 in intimate contact with the invisible ink comprising code indicia 23. Specifically, to ascertain the information required to decode a desired program, the subscriber merely applies localized pressure to the entire area within the boundaries of a particular aperture in encasing member 27, for example, aperture 28'. This may be most conveniently accomplished through the use of shading strokes with a pencil or the like. The corresponding area of solid film 24 is compressed and ruptured, thus releasing a specific portion of developer 25 which initiates color reaction. The code indicia 23 (673) required for reception of the desired program is thereby revealed.

The invention thus provides a novel code card which may be employed for conveying decoding information to subscribers in a subscription television system. The card is inherently simple and economical and is not susceptible to manipulation for the purpose of fraudulent acquisition of the stored information since once ruptured, the solid film 24 cannot be restored to its original condition without severe damage to the entire laminate. Appropriate charges for the subscription service may be levied on the basis of actual usage by merely scanning the card manually or mechanically for exposed indicia, and the collected service fees may be allocated between the several programs in the manner indicated by the location of the exposed indicia.

While a particular embodiment of the invention has been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

A code card device for use in a subscription television system comprising: an opaque base member having a surface constituted of a plurality of discrete areas individually bearing code indicia of an invisible ink; a transparent cover member overlying said surface of said base member, and means disposed between said base member and said cover member including a rupturable solid film containing a dispersed developer for said invisible ink normally withheld from contact with said indicia and color reactant with said invisible ink upon contact therewith in response to application of localized pressure rupturing said film to impart a permanent distinctive hue to said code indicia in contrast to said base member.

References Cited in the file of this patent

UNITED STATES PATENTS

| | | |
|---|---|---|
| 2,083,206 | Schoeller | June 8, 1937 |
| 2,550,468 | Green et al. | Apr. 24, 1951 |
| 2,648,924 | Brewster | Aug. 18, 1953 |
| 2,659,825 | Land | Nov. 17, 1953 |
| 2,689,306 | Land | Sept. 14, 1954 |
| 2,689,307 | Fairbank | Sept. 14, 1954 |